United States Patent
Kato et al.

(10) Patent No.: US 10,715,224 B2
(45) Date of Patent: Jul. 14, 2020

(54) TERMINAL, BASE STATION, WIRELESS COMMUNICATION SYSTEM AND CHANNEL STATE INFORMATION ACQUISITION METHOD

(71) Applicant: Panasonic Intellectual Property Management Co., Ltd., Osaka (JP)

(72) Inventors: Osamu Kato, Fukuoka (JP); Noriyuki Shimizu, Kanagawa (JP); Hideki Shingu, Tokyo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/466,628

(22) PCT Filed: Dec. 6, 2017

(86) PCT No.: PCT/JP2017/043722
§ 371 (c)(1),
(2) Date: Jun. 4, 2019

(87) PCT Pub. No.: WO2018/131335
PCT Pub. Date: Jul. 19, 2018

(65) Prior Publication Data
US 2019/0296808 A1    Sep. 26, 2019

(30) Foreign Application Priority Data

Jan. 16, 2017  (JP) .................................. 2017-005375

(51) Int. Cl.
*H04B 7/0452* (2017.01)
*H04B 7/06* (2006.01)
*H04W 16/28* (2009.01)

(52) U.S. Cl.
CPC ......... *H04B 7/0452* (2013.01); *H04B 7/0626* (2013.01); *H04B 7/0697* (2013.01); *H04W 16/28* (2013.01)

(58) Field of Classification Search
CPC .. H04B 7/0452; H04B 7/0626; H04B 7/0697; H04W 16/28
(Continued)

(56) References Cited

U.S. PATENT DOCUMENTS

2011/0019715 A1* 1/2011 Brisebois ............ H04W 72/005
375/130
2013/0286949 A1* 10/2013 Tomeba ............... H04B 7/0452
370/328
(Continued)

FOREIGN PATENT DOCUMENTS

| JP | 2015-053569 A | 3/2015 |
| JP | 2015-513257 A | 4/2015 |
| JP | 2016-528776 A | 9/2016 |
| JP | 2016-213760 A | 12/2016 |
| WO | 2014/208859 A1 | 12/2014 |

OTHER PUBLICATIONS

Tomohiro Nabeshima et al., Research Presentation of Tokyo Branch Student Conference of Institute of Electronics, Information and Communication Engineers in 2014, Presentation No. 116, "A Study on Accurate Compression Method of CSI Feedback in Massive MIMO Systems", The Institute of Electronics, Information and Communication Enginerrs (IEICE), 2015.

*Primary Examiner* — Hirdepal Singh
(74) *Attorney, Agent, or Firm* — Seed IP Law Group LLP

(57) ABSTRACT

A base station is capable of wireless communication with a plurality of terminals, the base station includes a memory that holds information on P (P: an integer of 3 or more) terminals currently connected to the base station, a determination unit that determines L (L: an integer satisfying $2 \leq L < P$) terminals that are to report channel state information indicating a state of a propagation path to the base station
(Continued)

from among the P terminals based on the information on the P terminals, at every data transmission cycle, a selector that selects M (M: an integer satisfying $2 \leq M \leq L$) terminals capable of spatial multiplex communication in the data transmission cycle based on the reporting of the channel state information from the L terminals, and a communicator that transmits data to and from the M terminals via a plurality of antennas using the spatial multiplex communication.

19 Claims, 9 Drawing Sheets

(58) Field of Classification Search
USPC .......................................................... 375/262
See application file for complete search history.

(56) References Cited

U.S. PATENT DOCUMENTS

| | | |
|---|---|---|
| 2015/0016379 A1 | 1/2015 | Nam et al. |
| 2016/0094324 A1 | 3/2016 | Lee et al. |
| 2016/0197709 A1 | 7/2016 | Shen et al. |
| 2017/0208613 A1 | 7/2017 | Nam et al. |
| 2017/0290046 A1* | 10/2017 | Sun ...................... H04W 72/082 |
| 2017/0346612 A1* | 11/2017 | Kim ....................... H04L 5/0057 |
| 2018/0184433 A1* | 6/2018 | Kim ....................... H04L 5/0048 |
| 2018/0254814 A1* | 9/2018 | Park ...................... H04B 7/0456 |
| 2018/0317112 A1* | 11/2018 | Seo ...................... H04B 17/345 |
| 2019/0207657 A1* | 7/2019 | Cao .......................... H04B 7/04 |

* cited by examiner

| TERMINAL IDENTIFICATION NUMBER | #1 | #2 | #3 | ... | #53 | ... | #59 | #60 |
|---|---|---|---|---|---|---|---|---|
| ORDER OF CONNECTION WITH BASE STATION | 1 | 2 | 3 | ... | 53 | ... | 59 | 60 |

| TERMINAL IDENTIFICATION NUMBER | #7 | #1 | #3 | ... | #60 | ... | #18 | #13 |
|---|---|---|---|---|---|---|---|---|
| AMOUNT OF DL DATA [Mbyte] | 27 | 26.1 | 25 | ... | 5.2 | ... | 2.5 | 1.1 |

FIG. 8

| TERMINAL IDENTIFICATION NUMBER # | GROUP | AMOUNT OF DL RECEPTION-SCHEDULED DATA [Mbyte] | VALUE n OF TERMINAL | DL RECEPTION HISTORY AT EVERY PAST DATA TRANSMISSION CYCLE (LAST...) | NOT RECEIVE IN LAST R TIMES OF DATA TRANSMISSION CYCLES | CSI MEASUREMENT REPORT |
|---|---|---|---|---|---|---|
| 1 | G1 | 2.5 | 4 | ××××xOxx... | 5 | PRESENT |
| 2 | G2 | 0.3 | 33 | ××OxxxxX... | 2 | ABSENT |
| 3 | G3 | 10.0 | 1 | xOOOxOxx... | 1 | PRESENT |
| 4 | G4 | 4.5 | 2 | OxxxxOxO... | 0 | ABSENT |
| 5 | G5 | 1.8 | 6 | xxxOxxOx... | 2 | ABSENT |
| 6 | G6 | 0.1 | 100 | xxxxxxOx... | 8 | ABSENT |
| 7 | G7 | 45.5 | 0 | OOxxOxxO... | 0 | PRESENT |
| 8 | G8 | 7.6 | 1 | xxOxxOxx... | 2 | PRESENT |
| ... | ... | ... | ... | ... | ... | ... |
| 98 | G8 | 3.8 | 3 | xOOxxOxx... | 1 | ABSENT |
| 99 | G9 | 2.4 | 4 | xxxOOxxx... | 3 | ABSENT |
| 100 | G10 | 12.3 | 1 | OxxxxxxO... | 0 | ABSENT |

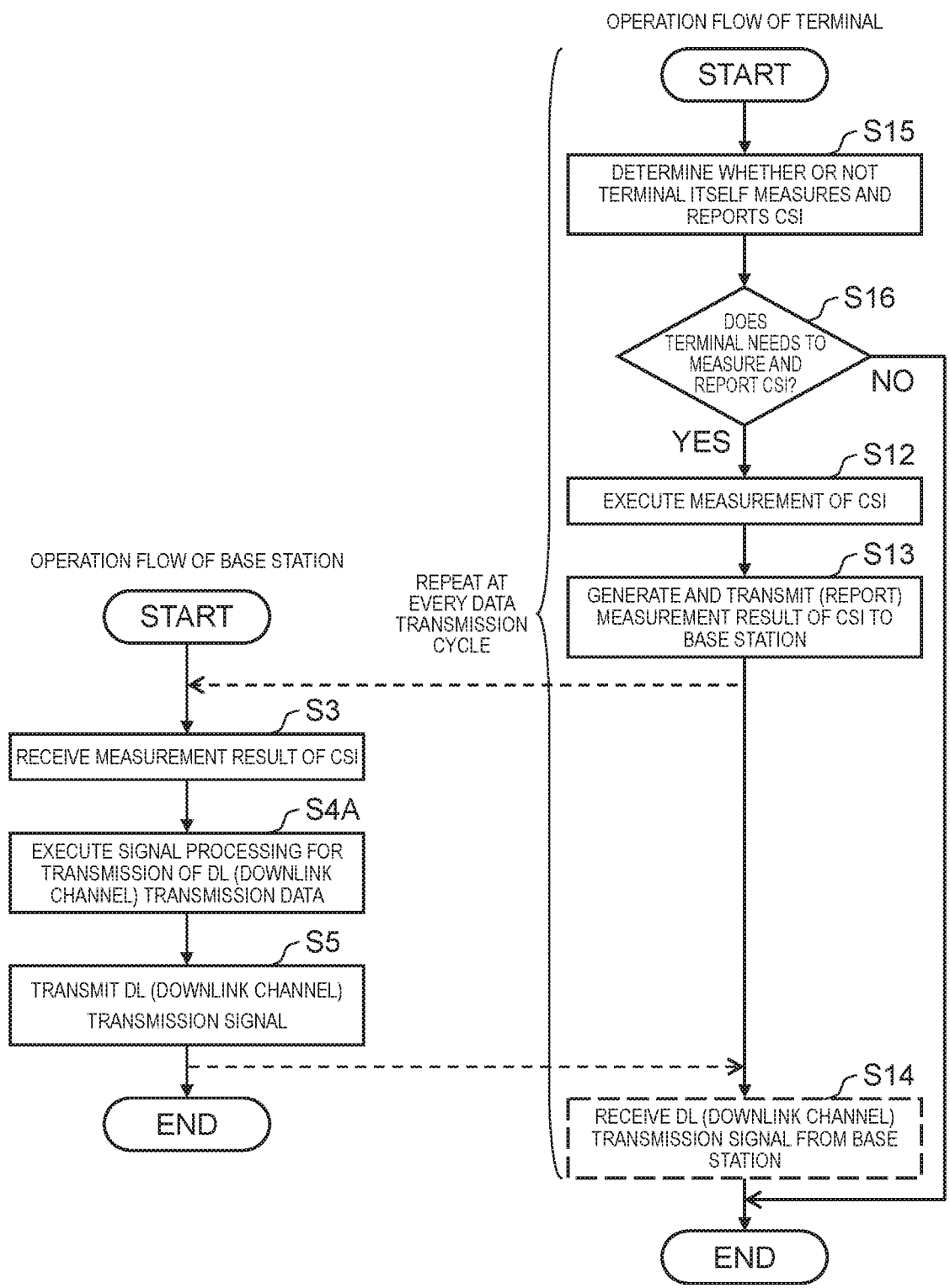

TERMINAL, BASE STATION, WIRELESS COMMUNICATION SYSTEM AND CHANNEL STATE INFORMATION ACQUISITION METHOD

TECHNICAL FIELD

The present disclosure relates to a terminal, a base station, a wireless communication system, and a channel state information acquisition method for acquiring channel state information indicating a state of a propagation path in wireless communication from a transmitting side to a receiving side.

BACKGROUND ART

Multi-input multi-output (MIMO) is known as an example of a technique realizing an increase in throughput of a wireless local area network (LAN). In MIMO, it is possible to improve a data rate (that is, frequency utilization efficiency) by sending and receiving data using many antennas on the transmitting side and the receiving side, and also it is possible to perform advanced beamforming. Beamforming is a technique that may control the amplitude and phase of a transmitted signal and a received signal at each antenna, thereby giving directivity to a transmission/reception beam and changing the shape of the beam.

In beamforming, a signal is sent so that the maximum signal power may be obtained at the receiving side (for example, terminal) after estimating on what kind of propagation path the signal transmitted by the transmitting side (for example, base station) is received on the receiving side. In order for the transmitting side to estimate the state of this propagation path, for example channel state information (CSI) is used.

CSI indicates channel state information and is measured on the receiving side based on quality information, for example, when a reference signal (RS) sent from the transmitting side is received at the receiving side. Based on the CSI fed back from the receiving side, the transmitting side calculates a channel estimation matrix having the transfer functions from the respective antennas on the transmitting side to the respective antennas on the receiving side as components to perform beamforming by using this channel estimation matrix. In this way, the transmitting side (for example, base station) may perform wireless communication by MIMO with a single receiving side (for example, terminal), or wireless communication (that is, multiple user (MU)-MIMO) by MIMO with a plurality of receiving sides (for example, terminals).

As the related art relating to sending a data signal by using beamforming in a communication system to which MIMO is applied, for example, PTL 1 has been proposed. In order to be able to transmit data signals by applying beamforming also to user terminals located away from the base station, PTL 1 discloses that a downlink reference signal (for example, channel state measurement reference signal (CSI-RS)) is transmitted to a user terminal by beamforming using a fixed weight and an appropriate weight is set by using an estimation result (CSI) from the user terminal.

CITATION LIST

Patent Literature

PTL 1: Japanese Patent Unexamined Publication No. 2015-53569

SUMMARY OF THE INVENTION

It is expected that a comfortable wireless communication environment may be realized if the transmitting side (for example, base station) and a plurality of receiving sides (for example, terminals) may communicate data by MU-MIMO. Here, it is known that an upper limit value (hereinafter, "M" is used as a character indicating the upper limit value for convenience) of the number of spatial multiplexes on the transmitting side (for example, base station) in the above-described MU-MIMO is not as large as, for example, about 2 to 8. Therefore, with the existing technique, for example, when 100 terminals are connected to a base station in a place where many people gather, such as a stadium, a theme park or a large conference center, the base station may only communicate with M terminals at maximum within one data transmission cycle, but wireless communication with 100 terminals is realized by the base station switching the terminal that is a data transmission target at every data transmission cycle.

However, in this existing technique, in the case of considering realization of MU-MIMO wireless communication on the premise of upper limit value M, if there are a large number of receiving sides (for example, terminals) as connection candidates with the transmitting side (for example, base station), it is considered that a problem will arise in the following points.

In other words, since it is possible to select 100 terminals reporting CSI (that is, the channel state information of the propagation path between each antenna of the terminal and each antenna of the base station) to the base station every data transmission cycle, which is the optimal combination of terminals from among all connected terminals, it is ideal from the viewpoint of maximizing the frequency utilization efficiency of the downlink. However, there is a problem that the traffic of the uplink (in other words, from the terminal to the base station) is wasted by an enormous number of pieces of CSI.

In addition, although upper limit value M of the number of spatial multiplexes in the MU-MIMO is a constant value and only a part of the terminals among all the terminals are selected for transmission of data signals, continuing to measure CSI at every data transmission cycle and reporting the CSI to the base station has the problem of increased power consumption at the terminals. Such problems are not taken into consideration also in PTL 1, so it can be said that the problems remain unresolved.

The present disclosure has been devised in view of the above-described conventional circumstances, and an object thereof is to provide a terminal, a base station, a wireless communication system, and a channel state information acquisition method that adaptively suppress an increase in uplink traffic and an increase in power consumption at the terminal, which is caused by measurement of channel state information indicating the state of a propagation path between the terminal connected to the base station and each antenna of the base station and reporting of the channel state information to the base station, and realize comfortable MU-MIMO communication environment.

The present disclosure provides a base station capable of wireless communication with a plurality of terminals, including a memory that holds information on P (P: an integer of 3 or more) terminals currently connected to the base station, a determination unit that determines L (L: an integer satisfying $2 \leq L < P$) terminals that are to report channel state information indicating a state of a propagation path to the base station from among the P terminals based on the information on the P terminals, at every data transmission cycle, a selector that selects M (M: an integer satisfying 2≤M≤L) terminals capable of spatial multiplex communication in the data transmission cycle based on the reporting of the channel state information from the L terminals, and a communicator that transmits data to and from the M terminals via a plurality of antennas using the spatial multiplex communication.

In addition, the present disclosure provides a channel state information acquisition method in a base station capable of wireless communication with a plurality of terminals, including a step of holding information on P (P: an integer of 3 or more) terminals currently connected to the base station, a step of determining L (L: an integer satisfying 2≤L<P) terminals that are to report channel state information indicating a state of a propagation path to the base station from among the P terminals based on the information on the P terminals, at every data transmission cycle, a step of selecting M (M: an integer satisfying 2≤M≤L) terminals capable of spatial multiplex communication in the data transmission cycle based on the reporting of the channel state information from the L terminals, and a step of transmitting data to and from the M terminals via a plurality of antennas using the spatial multiplex communication.

In addition, the present disclosure provides a wireless communication system capable of wireless communication between a plurality of terminals and a base station, in which the base station holds information on P (P: an integer of 3 or more) terminals currently connected to the base station and determines L (L: an integer satisfying 2≤L<P) terminals that are to report channel state information indicating a state of a propagation path to the base station from among the P terminals based on the information on the P terminals and further transmits an instruction for reporting the channel state information to the P terminals, at every data transmission cycle, the terminal measures the channel state information based on the instruction for reporting the channel state information transmitted from the base station and further reports a measurement result of the channel state information to the base station, and the base station selects M (M: an integer satisfying 2≤M≤L) terminals capable of spatial multiplex communication in the data transmission cycle based on the reporting of the measurement result of the channel state information from the L terminals and transmits data to and from the M terminals via a plurality of antennas using the spatial multiplex communication.

In addition, the present disclosure provides a terminal that is capable of communicating with a base station, including a memory that holds information on the terminal itself, a determination unit that determines necessity of reporting channel state information indicating a state of a propagation path to the base station based on the information on the terminal itself, at every data transmission cycle, a measurement unit that measures the channel state information based on the determination to report the channel state information, and a communicator that reports a measurement result of the channel state information to the base station, in which, the communicator receives data transmitted from the base station in a case where M (M: 2 or more preset values) terminals capable of spatial multiplex communication with the base station in the data transmission cycle are selected based on the measurement result of the channel state information.

In addition, the present disclosure provides a channel state information acquisition method in a terminal capable of communicating with a base station, including a step of holding information on the terminal itself, a step of determining necessity of reporting channel state information indicating a state of a propagation path to the base station based on the information on the terminal itself, at every data transmission cycle, a step of measuring the channel state information based on the determination to report the channel state information, a step of reporting a measurement result of the channel state information to the base station, and a step of receiving data transmitted from the base station in a case where M (M: 2 or more preset values) terminals capable of spatial multiplex communication with the base station in the data transmission cycle are selected based on the measurement result of the channel state information.

In addition, the present disclosure provides a wireless communication system capable of wireless communication between a plurality of terminals and a base station, in which the terminal holds information on the terminal itself, determines necessity of reporting channel state information indicating a state of a propagation path to the base station based on the information on the terminal itself, at every data transmission cycle, measures the channel state information based on the determination to report the channel state information, and reports a measurement result of the channel state information to the base station, the base station selects M (M: an integer satisfying 2≤M≤L) terminals capable of spatial multiplex communication in the data transmission cycle based on the reporting of the measurement result of the channel state information from the terminals, and transmits data to and from the M terminals via a plurality of antennas using the spatial multiplex communication, and the terminal receives the data transmitted from the base station by using the spatial multiplex communication in a case where M (M: a preset value of 2 or more) terminals capable of spatial multiplex communication with the base station in the data transmission cycle are selected based on the measurement result of the channel state information.

According to the present disclosure, it is possible to adaptively suppress an increase in uplink traffic and an increase in power consumption at the terminal, which is caused by measurement of channel state information indicating the state of a propagation path between the terminal connected to the base station and each antenna of the base station and reporting of the channel state information to the base station, and to realize comfortable MU-MIMO communication environment.

BRIEF DESCRIPTION OF DRAWINGS

FIG. 4A is a schematic diagram showing a first example of a connected terminal list held by the base station.

FIG. 4B is a schematic diagram showing a second example of the connected terminal list held by the base station.

FIG. 8 is a diagram showing an example of terminal-related information for each terminal connected to the base station.

FIG. 9 is a flowchart showing an example of each operation procedure of the base station and the terminal according to Exemplary Embodiment 2 in detail.

DESCRIPTION OF EMBODIMENT

Hereinafter, each exemplary embodiment specifically disclosing a terminal, a base station, a wireless communication system, and a channel state information acquisition method according to the present disclosure will be described in detail with reference to drawings as appropriate. However, detailed description may be omitted more than necessary. For example, there are cases where a detailed description of well-known matters and redundant description on substantially the same configuration may be omitted. This is for avoiding unnecessary redundancy of the following description and facilitating understanding by those skilled in the art. The accompanying drawings and the following description are provided to enable those skilled in the art to fully understand the present disclosure and are not intended to limit the claimed subject matters.

Exemplary Embodiment 1

Figure 1:
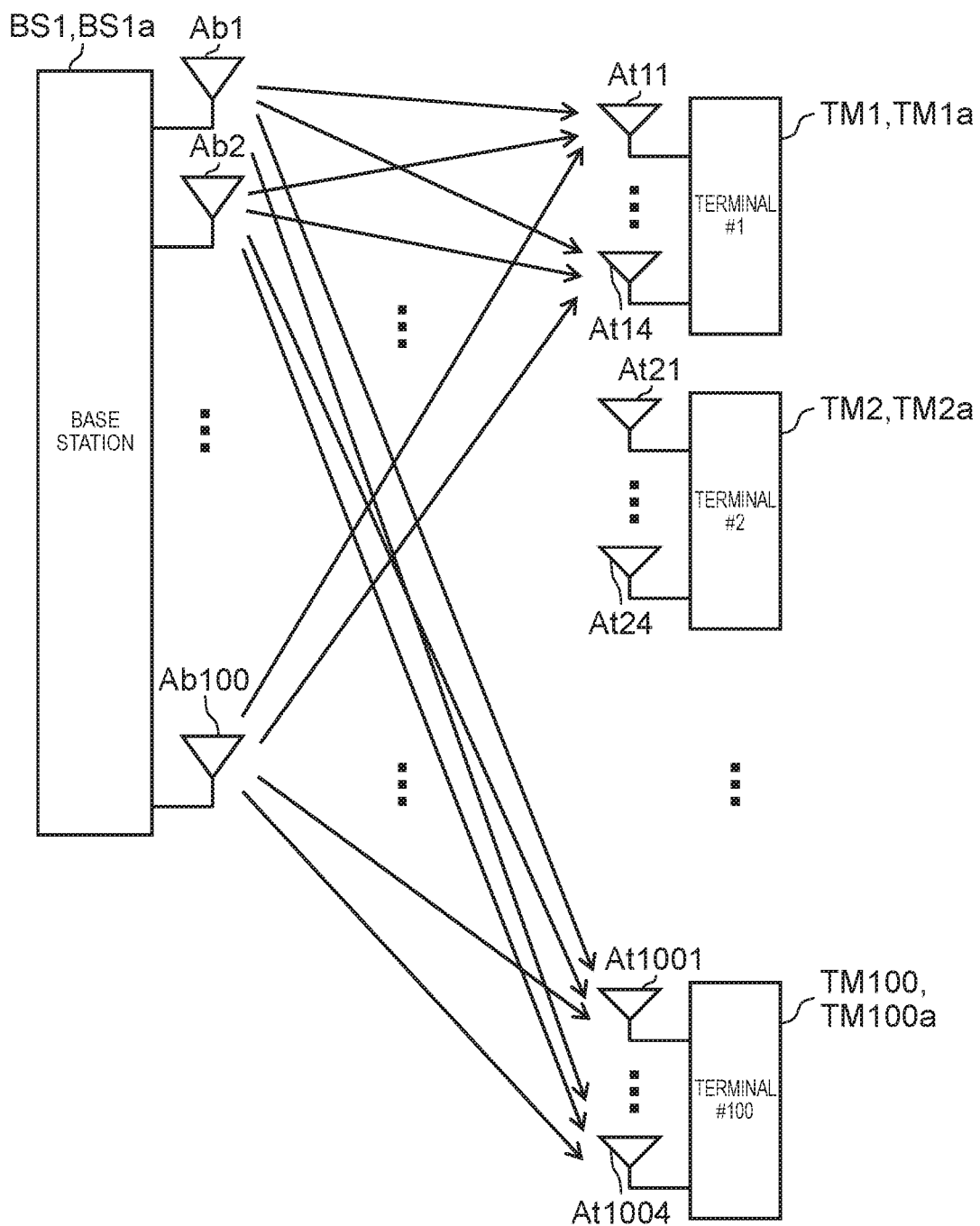
FIG. 1 is a diagram showing an example of a system configuration of a wireless communication system according to each exemplary embodiment.

In Exemplary Embodiment 1, a base station determines a part of terminals that measure and report channel state information (CSI) from all the terminals connected to the base station. FIG. 1 is a diagram showing an example of a system configuration of wireless communication system 10 according to each exemplary embodiment.

In Exemplary Embodiment 1, wireless communication system 10 is configured to include one base station BS1 and a plurality of terminals TM1, TM2, . . . , and TM100. Base station BS1 and individual terminals may be connected and wirelessly communicated via a wireless communication channel. The wireless communication channel broadly includes various public channels, mobile phone channels, wide area wireless channels, and the like. Hereinafter, an example will be described in which base station BS1 transmits downlink (DL) data to a predetermined number (see later) of terminals by using spatial multiplex communication (in other words, MU-MIMO (Multiple User Multi Input Multi Output) communication). A downlink (DL) is a wireless channel heading from base station BS1 to the terminal, while an up link is a wireless channel heading from the terminal to base station BS1.

Base station BS1 has a plurality of antennas Ab1, Ab2, . . . , and Ab100. Although the number of installed antennas of base station BS1 is exemplified as 100, it is needless to say that the number of antenna is not limited to 100 but may be a power of 2 such as 128, 1024 or the like.

Base station BS1 transmits downlink data (hereinafter, referred to as "DL transmission data") via a plurality of antennas Ab1 to Ab100 to and from a predetermined number (hereinafter, M (M: a predetermined integer value of 2 or more)) of terminals simultaneously capable of spatial multiplex communication on the same frequency, at every data transmission cycle. That is, M represents the maximum value of the number of spatial multiplexes in one data transmission cycle. M is an integer value of about 2 to 8, for example. For example, in FIG. 1, it is shown that terminal TM1 having the terminal identification number "#1" and terminal TM100 having the terminal identification number "#100" as the M terminals have received the DL transmission data transmitted from base station BS1 by spatial multiplex communication in the same data transmission cycle. The terminal identification number is a number that may identify a terminal, and may be, for example, a telephone number of a terminal or a manufacturing number of a terminal.

Base station BS1 grasps channel matrix A having transfer function aij from respective antenna i (i: an integer from 1 to 100) of base station BS1 to respective antennas j (j: an integer from 1 to 400) of terminal TM1 or terminal TM100 as components before transmitting the DL transmission data to terminal TM1 or terminal TM100. j has a maximum value of 400 in a case where the number of installed antennas of a terminal is 4 and the number of terminals is 100, for example. In this way, multi-user spatial multiplex transmission (that is, MU-MIMO transmission) between base station BS1 and terminal TM1 or between base station BS1 and terminal TM100 may be realized.

In addition, since transfer function aij varies over time, it is necessary for base station BS1 to acquire transfer function aij by updating transfer function aij, for example, for each data transmission cycle (for example, 1 msec or 10 msec). In order to acquire this transfer function aij, in Exemplary Embodiment 1, base station BS1 transmits an instruction for executing measurement and reporting of channel state information (CSI) indicating a state of a propagation path to base station BS1 to a part of terminals determined by base station BS1, at every data transmission cycle. In a case where a terminal has received an execution instruction from base station BS1, the terminal measures the channel state information (CSI) indicating the state of the propagation path to base station BS1 to report a measurement result to base station BS1. Base station BS1 determines a maximum of M terminals to be downlink transmission targets by using the channel state information (CSI) reported from the corresponding part of the terminals and transmits DL transmission data to the maximum of M units of terminals simultaneously on the same frequency by generating a MU-MIMO spatial multiplex transmission signal from transfer function aij estimated on the basis of the channel state information (CSI) from the M or fewer terminals.

In wireless communication system 10, a high-frequency band (for example, 28 GHz band which is being considered for use in 5G (5th generation mobile communication system)) may be assumed as a wireless standard scheme to be used between base station BS1 and individual terminals. A wireless communication scheme to be applied mainly in each exemplary embodiment has, for example, a large number of antennas in a base station and has a function of spatial multiplex communication between the base station and a plurality of terminals, and 5G (5th generation mobile communication system) is a typical example thereof. However, the base station and the terminal in wireless communication system 10 may have different wireless communication standards (for example, wireless communication standards such as long term evolution (LTE), wireless local area network (LAN), digital enhanced cordless telecommunication (DECT), 3G (3rd generation mobile communication system)) at the same time.

The network configured by wireless communication system 10 may not be a C/U separation type network or may be a C/U separation type network. In the present exemplary embodiment, a network that is not a C/U separation type is exemplified. That is, in wireless communication system 10, control data communication and user data communication are performed by the same base station BS1.

Base station BS1 is, for example, a small-cell base station or a macro-cell base station capable of providing high-speed throughput based on the 28 GHz band described above. The communicable range of base station BS1 is determined, for example, according to the position and the cell radius of base station BS1. Base station BS1 is placed in a large conference room such as a factory, a construction site, a stadium, a theme park, an international conference center or the like. The terminal also communicates control data and communicates user data with base station BS1. The control data includes data relating to C (Control)-Plane. The user data includes data relating to U (User)-Plane. The user data includes, for example, image data (for example, moving image and still image), audio data, and a large amount of data.

The C-plane is a communication protocol for communicating control data for call connection and wireless resource allocation in wireless communication. The U-plane is a communication protocol for actually communicating (for example, video communication, audio communication, and data communication) between the terminal and base station BS1 by using the allocated wireless resources.

Figure 2:
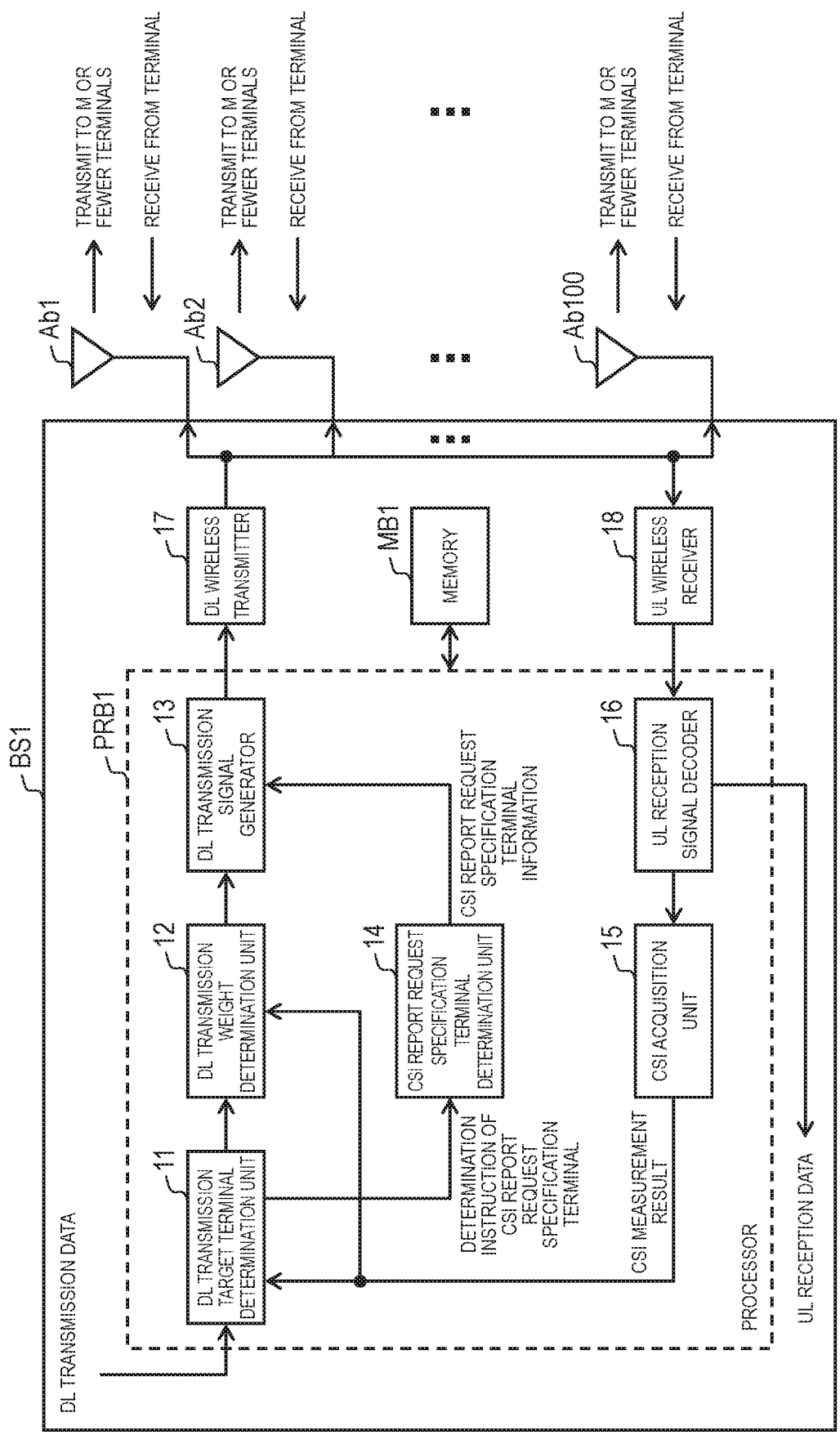
FIG. 2 is a block diagram showing an example of an internal configuration of a base station according to Exemplary Embodiment 1 in detail.

FIG. 2 is a block diagram showing an example of an internal configuration of base station BS1 according to Exemplary Embodiment 1 in detail.

Base station BS1 shown in FIG. 2 is configured to include processor PRB1, memory MB1, DL wireless transmitter 17, UL wireless receiver 18, and antennas Ab1 to Ab100. In FIGS. 1 and 2, the number of antennas possessed by base station BS1 is exemplified as 100, but it is needless to say that the number of antennas is not limited to 100.

Processor PRB1 is configured by using, for example, a central processing unit (CPU), a micro processing unit (MPU), or a digital signal processor (DSP). Processor PRB1 cooperates with memory MB1 to perform various processes and controls. More specifically, processor PRB1 refers to the program and data stored in memory MB1 and executes the program to realize the functions of the following units. Each of these units includes DL transmission target terminal determination unit 11, DL transmission weight determination unit 12, DL transmission signal generator 13, CSI report request specification terminal determination unit 14, CSI acquisition unit 15, and UL reception signal decoder 16.

In down link (DL) transmission target terminal determination unit 11, DL transmission data from a host device (for example, core network device) is input to base station BS1. The DL transmission data is the above-described user data, for example, image data or audio data. In a case where M units of terminals capable of simultaneous spatial multiplex communication (MU-MIMO communication) on the same frequency are not determined, DL transmission target terminal determination unit 11 outputs an instruction for determining a specified terminal that is requested to report the channel state information (CSI) indicating the state of the propagation path to base station BS1 to CSI report request specification terminal determination unit 14, at every data transmission cycle. This is because DL transmission target terminal determination unit 11 suppresses the increase in UL (Up Link, that is, from the terminal to base station BS1) traffic due to the CSI reporting by causing CSI report request specification terminal determination unit 14 to limit the terminals that are to measure and report channel state information (CSI) to a part (L terminals to be described later) from all the terminals connected to base station BS1.

In addition, DL transmission target terminal determination unit 11 as an example of a selector determines M units of terminals capable of simultaneous spatial multiplex communication (MU-MIMO communication) on the same frequency in a data transmission cycle based on the reporting of the measurement result of the channel state information (CSI) from each specified terminal (L terminals to be described later). DL transmission target terminal determination unit 11 outputs the DL transmission data and the information on the M units of terminals to DL transmission weight determination unit 12.

DL transmission weight determination unit 12 calculates and determines a transmission weight for forming the directivity of a transmission beam of the MIMO spatial multiplex transmission signal based on the information on the M units of terminals and the measurement result of the channel state information (CSI) from each specified terminal (L units of terminals to be described later), at every data transmission cycle. DL transmission weight determination unit 12 outputs the transmission weight and the DL transmission data to DL transmission signal generator 13. Since the operation of DL transmission weight determination unit 12 is a well-known technique, a detailed description thereof will be omitted.

DL transmission signal generator 13 generates notification information (CSI report request specification terminal information to be described later) indicating which specified terminals (L terminals to be described later) are requested to measure and report channel state information (CSI) and a reference signal (RS) which is a fixed pattern for measuring the channel state information (CSI) and outputs the information and the reference signal to DL wireless transmitter 17. These pieces of CSI report request specification terminal information and the reference signal (RS) are not beamforming transmissions from base station BS1 to the L units of terminals, but are transmitted, for example, on a common control channel common to all terminals currently connected to base station BS1. The CSI report request specification terminal information does not have to be transmitted from all the antennas of base station BS1. Since the reference signal (RS) is a target of channel state information (CSI) measurement, the reference signal needs to be transmitted from all the antennas of the base station.

In addition, DL transmission signal generator 13 generates DL transmission signals that may be transmitted to M units of terminals capable of simultaneous spatial multiplex communication (MU-MIMO communication) on the same frequency by using the transmission weight and the DL transmission data, at every data transmission cycle. That is, DL transmission signal generator 13 generates DL transmission signals that may receive DL transmission data at the M units of terminals to output the DL transmission signals to DL wireless transmitter 17 by using a beamforming technique.

CSI report request specification terminal determination unit 14 as an example of a determination unit determines L (L: an integer satisfying $2 \leq L < P$) units of terminals that are to report channel state information (CSI) from among a total of P (P: integer of 3 or more) units of terminals currently connected to base station BS1 based on the instruction for determining specified terminals that are requested to report channel state information (CSI), at every data transmission cycle. CSI report request specification terminal determination unit 14 outputs information (hereinafter, referred to as "CSI report request specification terminal information") on L specified terminals that are to report channel state information (CSI) to DL transmission signal generator 13.

FIG. 4A is a schematic diagram showing a first example of a connected terminal list held by base station BS1.

Connected terminal list T1 shown in FIG. 4A includes information on the identification number (terminal identification number) of each terminal as an example of information on the terminal connected to base station BS1 and information on the sequence (order) of connection with base station BS1 at each terminal. In FIG. 4A, the terminal identification information and the sequence (order) of connection of each terminal to base station BS1 correspond to each other. Therefore, for example, base station BS1 is currently connected to a total of 60 units of terminals including the terminal identification numbers "#1" to "#60" and has started to connect in order of terminal "#1", terminal "#2", terminal "#3", . . . , terminal "#53", . . . , terminal "#59", and terminal "#60". Although not shown in FIG. 4A, the information indicating the order of connection to base station BS1 may further include, for example, time information when the terminal is connected to base station BS1.

CSI report request specification terminal determination unit 14 reads connected terminal list T1 held in memory MB1 to determine L (L: an integer satisfying 2≤L<P) units of terminals that are to report channel state information (CSI) on L units at a time in order of terminal identification numbers in respective terminals connected to base station BS1, at every data transmission cycle. In this way, CSI report request specification terminal determination unit 14 may easily and quickly determine L units of terminals that are to report channel state information (CSI) at every data transmission cycle.

FIG. 4B is a schematic diagram showing a second example of the connected terminal list held by base station BS1.

Connected terminal list T2 shown in FIG. 4B includes, information on the identification number (terminal identification number) of each terminal and information on the amount of DL transmission data to be transmitted by base station BS to each terminal as an example of information on the terminal connected to base station BS1. For example, amounts of DL transmission data are shown in descending order from the left side of the page of FIG. 4B toward the right side of the page. Therefore, for example, base station BS1 is currently connected to a total of 60 units of terminals including the terminal identification numbers "#1" to "#60" and transmits a large amount of DL transmission data in order of terminal "#7", terminal "#1", terminal "#3", . . . , terminal "#60", . . . , terminal "#18", and terminal "#13". The amount of DL transmission data is "27 megabytes" for terminal "#7", "26.1 megabytes" for terminal "#1", "25 megabytes" for terminal "#3", . . . , "5.2 megabytes" for terminal "#60", . . . , "2.5 megabytes" for terminal "#18", and "1.1 megabytes" for terminal "#13".

CSI report request specification terminal determination unit 14 reads connected terminal list T2 held in memory MB1 to determine L units of terminals as the L (L: an integer satisfying 2≤L<P) units of terminals that are to report channel state information (CSI) in order of priority in descending order of the amount of DL transmission data, at every data transmission cycle. In this way, CSI report request specification terminal determination unit 14 may determine L units of specified terminals that are to report channel state information (CSI) so that communication with a terminal (destination) to which data (for example, video data) with a large amount of DL transmission data is sent may be continued with priority.

In addition, CSI report request specification terminal determination unit 14 may read connected terminal list T2 held in memory MB1 to change the selection frequency of the L units of terminals that are to report channel state information (CSI) according to the amount of DL transmission data, at every data transmission cycle. For example, in a case where the number of terminals with a large amount of DL transmission data is equal to or larger than a predetermined value, CSI report request specification terminal determination unit 14 may continuously select the same L units of terminals determined in a current data transmission cycle over a predetermined number of data transmission cycles including the current data transmission cycle. In this way, since a terminal with a large amount of DL transmission data may be determined as a terminal capable of reporting channel state information (CSI) over the predetermined number of data transmission cycles, CSI report request specification terminal determination unit 14 may support continuous communication between the terminal with a large amount of DL transmission data and base station BS1.

In addition, memory MT1 holds information indicating whether or not a predetermined agreement (SLA: Service Level Agreement) has been made among the terminals currently connected to base station BS1 and rank information or level information (hereinafter, referred to as "agreement related information") in the agreement. CSI report request specification terminal determination unit 14 reads the agreement related information (not shown) held in memory MB1 to determine L units of terminals as the L (L: an integer satisfying 2≤L<P) units of terminals that are to report channel state information (CSI) in preference to the terminals that have already made the above-described predetermined agreement and have higher rank information or level information in the agreement, at every data transmission cycle. In this way, CSI report request specification terminal determination unit 14 may determine L specified terminals that are to report channel state information (CSI) in order to prioritize communication with terminals of a part of paid members who have made a predetermined agreement and even terminals of paid members belonging to a higher rank or level of agreement among the paid members, for example.

From the output of the UL reception signal decoder 16, CSI acquisition unit 15 acquires the measurement result of the channel state information (CSI) transmitted from each of the L specified terminals. CSI acquisition unit 15 outputs the measurement result of the channel state information (CSI) transmitted from each of the L specified terminals to DL transmission target terminal determination unit 11 and DL transmission weight determination unit 12, respectively.

UL reception signal decoder 16 acquires and decodes the output (that is, UL reception signal) of UL wireless receiver 18. The decoded output of UL reception signal decoder 16 is the measurement result of the channel state information (CSI) transmitted from each of the L units of specified terminals or any one of the UL reception data respectively transmitted from the M units of terminals (that is, terminals capable of performing MU-MIMO transmission with base station BS in a data transmission cycle), or both.

In a case where UL reception signal decoder 16 has obtained the measurement result of the channel state information (CSI) transmitted from each of the L specified terminals, UL reception signal decoder 16 outputs the measurement result of the channel state information (CSI) transmitted from each of the L specified terminals to CSI acquisition unit 15. On the other hand, in a case where UL reception signal decoder 16 has obtained the UL reception data respectively transmitted from the M units of terminals (that is, terminals capable of performing MU-MIMO transmission with base station BS in a data transmission cycle), UL reception signal decoder 16 outputs the UL reception data respectively transmitted from the M units of terminals (that is, terminals capable of performing MU-MIMO transmission with base station BS in a data transmission cycle) to the host device (for example, core network device, not shown) of base station BS1.

DL wireless transmitter 17 as an example of a communicator transmits the DL transmission signal generated by DL transmission signal generator 13 by using the beamforming technique from each of antennas Ab1 to Ab100 to the M units of terminals. In addition, DL wireless transmitter 17 transmits the reference signal (RS) generated by DL transmission signal generator 13 from respective antennas Ab1 to Ab100 to the L units of terminals.

UL wireless receiver 18 as an example of a communicator receives the UL reception signals transmitted from the M units of terminals via antennas Ab1 to Ab100 and outputs the UL reception signals to UL reception signal decoder 16.

Memory MB 1 includes, for example, a random-access memory (RAM) as a work memory to be used at the time of processing of base station BS1 and a read only memory (ROM) for storing a program and data defining the operation of base station BS1. Various data and information are temporarily stored in the RAM. In the ROM, a program defining the operation of base station BS1 (for example, processing (steps) to be performed as the channel state information acquisition method according to the present exemplary embodiment) is written.

In addition, memory MB1 stores (holds) connected terminal list T1 shown in FIG. 4A or connected terminal list T2 shown in FIG. 4B. In FIG. 2, memory MB1 is shown as a separate configuration from processor PRB1, but may be built in processor PRB1. Memory MB1 may include a secondary storage device together with a primary storage device.

Figure 3:
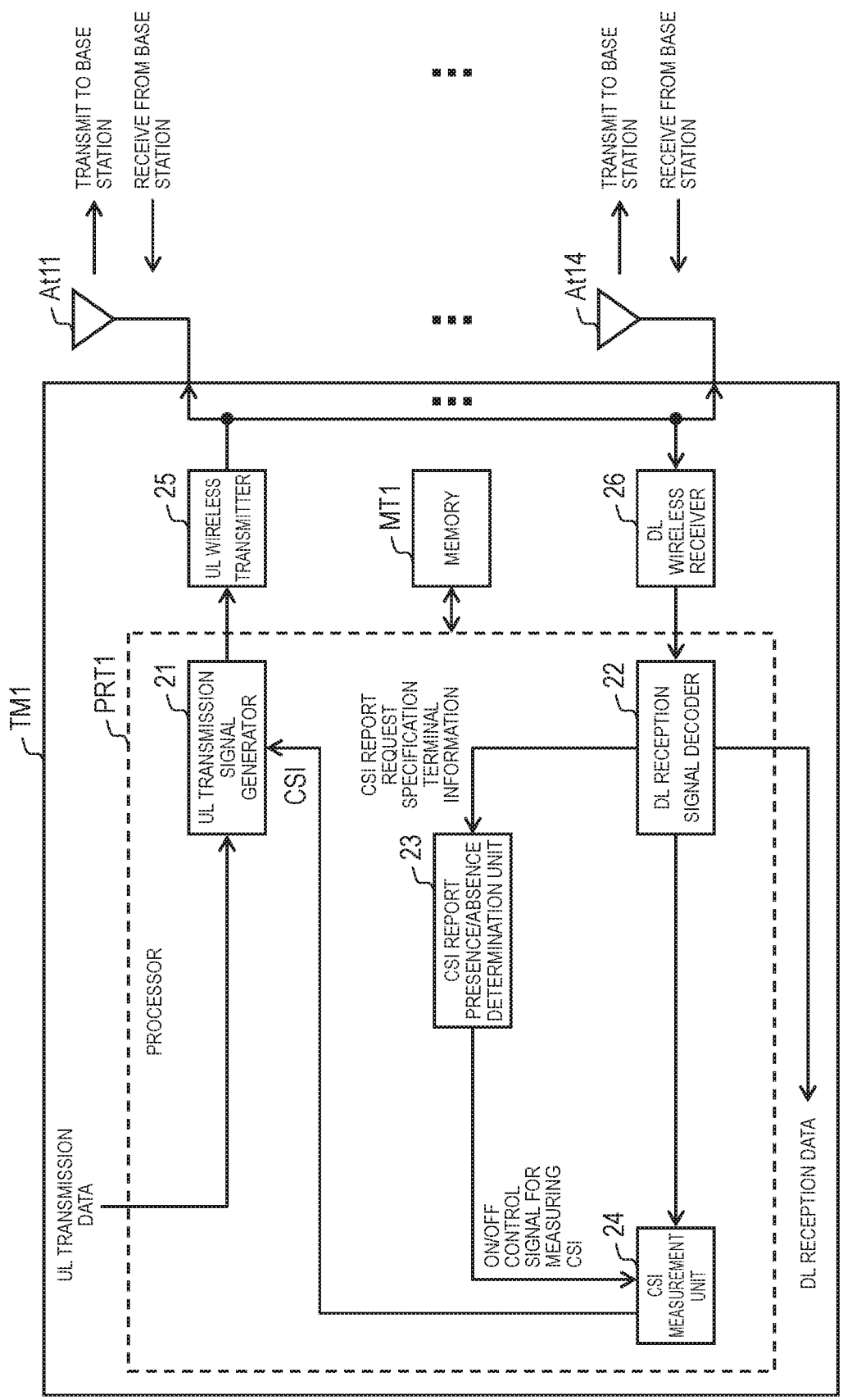
FIG. 3 is a block diagram showing an example of an internal configuration of a terminal according to Exemplary Embodiment 1 in detail.

FIG. 3 is a block diagram showing an example of an internal configuration of terminal TM1 according to Exemplary Embodiment 1 in detail.

Since the internal configuration of each of terminals TM1 to TM100 shown in FIG. 1 is the same, in FIG. 3, terminal TM1 will be exemplified and described in detail. Each of terminals TM1 to TM100 is a terminal capable of wireless communication with base station BS1 and is, for example, a mobile phone, a smartphone, or a tablet terminal. Terminals TM1 to TM100 may have a telephone function or may not have a telephone function.

Terminal TM1 shown in FIG. 3 is configured to include processor PRT1, memory MT1, UL wireless transmitter 25, DL wireless receiver 26, and antennas At11 to At14. In FIGS. 1 and 3, the number of antennas possessed by terminal TM1 is exemplified as 4, but it is needless to say that the number of antennas is not limited to 4.

Processor PRT1 is configured by using, for example, a CPU, an MPU, or a DSP. Processor PRT1 cooperates with memory MT1 to perform various processes and controls. More specifically, processor PRT1 refers to the program and data stored in memory MT1 and executes the program to realize the functions of the following units. Each of these units includes UL transmission signal generator 21, DL reception signal decoder 22, CSI report presence/absence determination unit 23, and CSI measurement unit 24.

UL transmission signal generator 21 obtains uplink data (hereinafter, referred to as "UL transmission data") generated in response to an operation on a user application of terminal TM1, for example. UL transmission signal generator 21 generates a UL transmission signal for transmitting the UL transmission data to base station BS1 and outputs the UL transmission signal to UL wireless transmitter 25. The UL transmission data may be user data (for example, image data or audio data), or control data (for example, distribution request for images or audio).

In addition, UL transmission signal generator 21 obtains the channel state information (CSI: information indicating the state of the propagation path between base station BS1 and terminal TM1) measured by CSI measurement unit 24. UL transmission signal generator 21 generates a UL transmission signal for transmitting the channel state information (CSI) to base station BS1 and outputs the UL transmission signal to UL wireless transmitter 25.

DL reception signal decoder 22 acquires and decodes the output (that is, DL reception signal) of DL wireless receiver 26. The decoded output of DL reception signal decoder 22 is either one of the reference signal (RS) or the DL reception data transmitted from base station BS1.

In a case where DL reception signal decoder 22 has obtained the reference signal (RS) transmitted from base station BS1, DL reception signal decoder 22 outputs the reference signal (RS) to CSI measurement unit 24 and outputs the CSI report request specification terminal information included in the data frame of the reference signal (RS) to CSI report presence/absence determination unit 23. On the other hand, in a case where DL reception signal decoder 22 has obtained the DL reception data transmitted from base station BS1, DL reception signal decoder 22 outputs the DL reception data to the application (not shown).

Based on the output (that is, the CSI report request specification terminal information included in the data frame of the reference signal (RS)) of DL reception signal decoder 22, CSI report presence/absence determination unit 23 determines whether or not the terminal itself needs to measure and report channel state information (CSI). In accordance with the determination result, CSI report presence/absence determination unit 23 outputs an ON/OFF control signal for measuring the channel state information (CSI) to CSI measurement unit 24.

For example, in a case where CSI report presence/absence determination unit 23 determines that the identification number of the terminal itself (terminal identification number) is included in the CSI report request specification terminal information, CSI report presence/absence determination unit 23 determines that the terminal itself measures and reports channel state information (CSI) and outputs an ON/OFF control signal to that effect (that is, a control signal for measuring and reporting CSI) to CSI measurement unit 24. On the other hand, in a case where CSI report presence/absence determination unit 23 determines that the identification number of the terminal itself (terminal identification number) is not included in the CSI report request specification terminal information, CSI report presence/absence determination unit 23 determines that the terminal itself does not measure and report channel state information (CSI) and outputs an ON/OFF control signal to that effect (that is, a control signal for not measuring and reporting CSI) to CSI measurement unit 24.

In a case where the ON/OFF control signal from CSI report presence/absence determination unit 23 indicates determination to measure and report channel state information (CSI), CSI measurement unit 24 measures channel state information (CSI) indicating the state of the propagation path between base station BS1 and the terminal itself (for example, terminal TM1) based on the output (that is, reference signal (RS)) from DL reception signal decoder 22. CSI measurement unit 24 measures channel state information (CSI) for the reference signal (RS) transmitted from base station BS1. CSI measurement unit 24 outputs the measurement result of the channel state information (CSI) to UL transmission signal generator 21.

UL wireless transmitter 25 as an example of a communication unit transmits the UL transmission signal (specifically, a UL transmission signal for transmitting UL transmission data to base station BS1) generated by UL transmission signal generator 21 from antennas At11 to At14 to base station BS1. In addition, UL wireless transmitter 25 transmits the UL transmission signal (specifically, a UL transmission signal for transmitting channel state information (CSI) to base station BS1) generated by UL transmission signal generator 21 from antennas At11 to At14 to base station BS1.

DL wireless receiver 26 as an example of a communicator receives the DL reception signal transmitted from base station BS1 via antennas At11 to At14 to outputs the DL reception signal to DL reception signal decoder 22.

Memory MT1 includes, for example, a RAM as a work memory to be used at the time of the processing of terminal TM1, and a ROM for storing a program and data defining the operation of terminal TM1. Various data and information are temporarily stored in the RAM.

For example, memory MT1 temporarily stores the measurement result of the channel state information (CSI) measured by CSI measurement unit 24.

Figure 5:
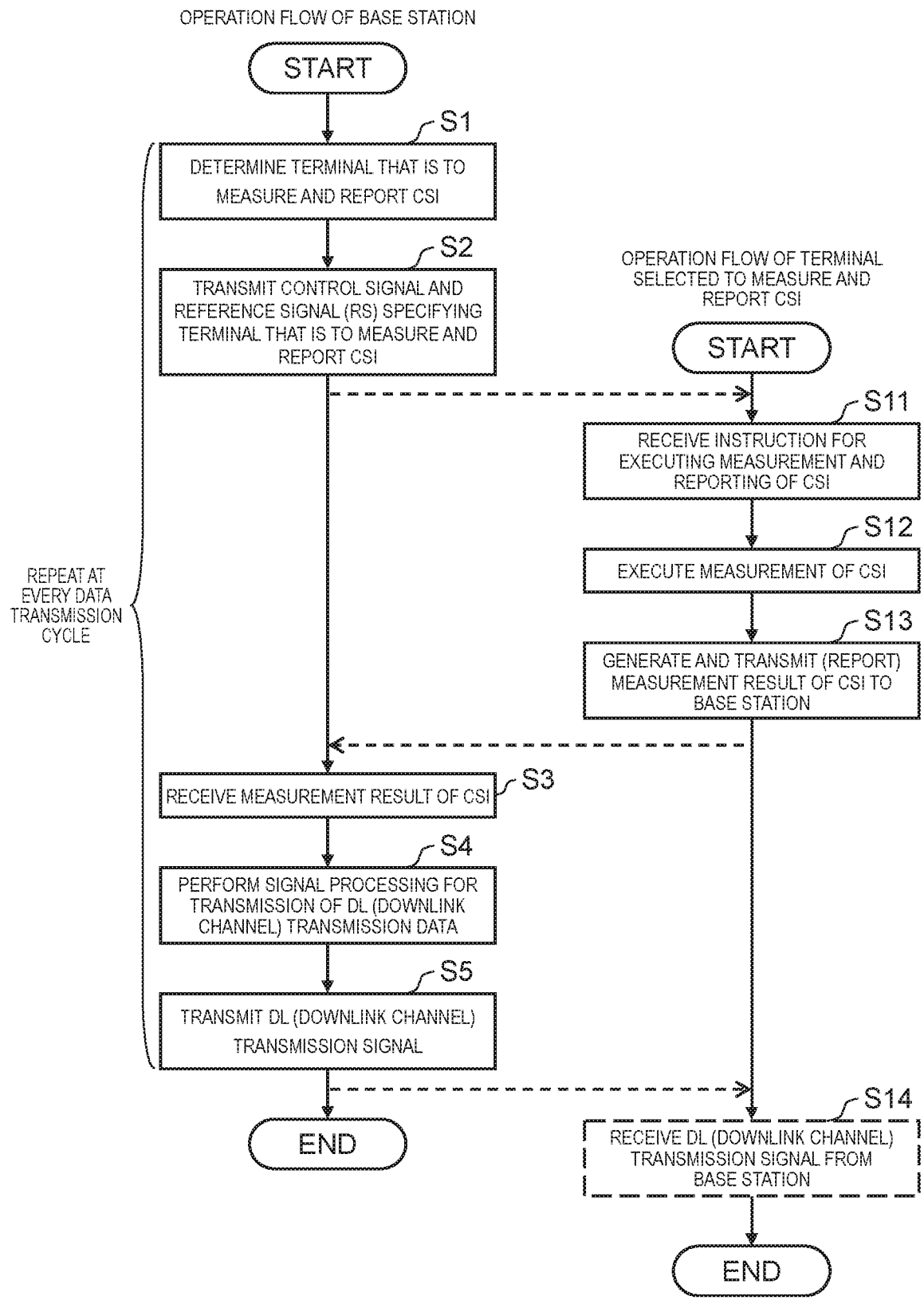
FIG. 5 is a flowchart showing an example of each operation procedure of the base station and the terminal according to Exemplary Embodiment 1 in detail.

Next, the operation procedure of base station BS1 and a terminal in Exemplary Embodiment 1 will be described with reference to FIG. 5. FIG. 5 is a flowchart showing an example of each operation procedure of base station BS1 and terminal TM1 according to Exemplary Embodiment 1 in detail. In the description of FIG. 5, the operation procedure of the terminal will be described by exemplifying terminal TM1 shown in FIG. 1. Base station BS1 and terminal TM1 repeat the respective operation flows shown in FIG. 5 at every data transmission cycle. The operation procedure of the terminal described in FIG. 5 shows the operation flow in the terminals determined as the L units of terminals that are to measure and report channel state information (CSI) in base station BS1.

In FIG. 5, base station BS1 determines L (for example, kM units, k is an integer from 2 to 5, for example) terminals that are to measure and report channel state information (CSI) from P (for example, 100) units of terminals currently connected to base station BS1 at every data transmission cycle (S1). As described above, for example, a method of determining L units of terminals is any one of a method of determining terminals in order of connection to base station BS1 based on connected terminal list T1 held in memory MB1, a method of determining terminals in descending order of the amount of DL transmission data based on connected terminal list T2 held in memory MB1, or a method of determining terminals in order from a terminal that has already made a predetermined agreement and has higher rank information or level information in the agreement. However, the method of determining the L units of terminals is not limited to these determination methods.

Therefore, in Exemplary Embodiment 1, as a result of processing of step S1, the measurement results of the CSI from all the terminals (P units) currently connected to base station BS1 are not reported to base station BS1, and measurement results of CSI are reported from a part (L terminals, L<P) of the P units of terminals. In this way, when the measurement result of the CSI is reported from the terminal, it is possible to suppress an increase in traffic in the uplink (UL).

Base station BS1 transmits a reference signal (RS), which is a fixed pattern for measuring the notification information (that is, CSI report request specification terminal information) on which L units of terminals are determined in step S1 and channel state information (CSI), to the P units of terminals as an instruction for reporting channel state information (CSI) (S2). These pieces of CSI report request specification terminal information and the reference signal are transmitted by, for example, a common control channel instead of beamforming transmission. The CSI report request specification terminal information does not have to be transmitted from all the antennas of base station BS1. Since the reference signal (RS) is a target of channel state information (CSI) measurement, the reference signal needs to be transmitted from all the antennas of base station BS1.

The terminals (specified terminals) determined as the L units of terminals by the processing of step S1 of base station BS1 know that the terminal itself is to measure and report channel state information (CSI) according to the CSI report request specification terminal information transmitted from base station BS1 in step S2 (S11). Then, these terminals (specified terminals) receive and process the reference signal (RS) transmitted from base station BS1, whereby the channel state information (CSI) indicating the state of the propagation path between base station BS1 and the terminal itself is measured (S12). The terminals (specified terminals) generate and transmit (reports) the measurement result of the channel state information (CSI) to base station BS1 (S13).

Base station BS1 receives the measurement result of the channel state information (CSI) transmitted from the terminal (specified terminal) in step S13 (S3). In step S3, base station BS1 receives the measurement results of the respective channel state information (CSI) from the total of L units of terminals.

Base station BS1 performs various signal processing for transmission of downlink transmission data (DL transmission data) by using the beamforming technique (S4). For example, in DL transmission target terminal determination unit 11, base station BS1 selects M units of terminals as a terminal (destination) to which the UL transmission data is sent by considering whether the channel state information (CSI) is good among the measurement results of the channel state information (CSI) received from the total of L units of terminals (specified terminals) in step S3, which M terminals are combined to make each MIMO stream have a high transmission rate or the like. In DL transmission weight determination unit 12, base station BS1 calculates and determines a transmission weight for forming the directivity of a transmission beam of the MIMO spatial multiplex transmission signal based on the information on the M units of terminals and the measurement result of the channel state information (CSI) from each specified terminal (L units of terminals). Base station BS1 generates DL transmission signals that may be transmitted to the M units of terminals capable of simultaneous spatial multiplex communication (MU-MIMO communication) on the same frequency by using the transmission weight and the DL transmission data in DL transmission signal generator 13.

Base station BS1 transmits the DL transmission signals generated by the beamforming technique in step S4 from respective antennas Ab1 to Ab100 to the M units of terminals (S5).

In step S4, the terminals (in other words, terminals selected as a total of M units of terminals) selected as a terminal (destination) to which downlink transmission data (DL transmission data) is sent, receive the DL transmission signals transmitted from base station BS1 in step S5 (S14).

In step S1, even in the case of the determined L units of terminals, the terminals not selected as a terminal (destination) to which downlink transmission data (DL transmission data) is sent in step S4, do not receive the DL transmission signals transmitted from base station BS1 in step S5.

As described above, in wireless communication system 10 of Exemplary Embodiment 1, base station BS1 holds information on all the terminals (specifically, P units (P: an integer of 3 or more)) currently connected to base station BS1 in memory MB1 and determines L (L: an integer satisfying 2≤L<P) units of terminals that are to report channel state information (CSI) indicating the state of the propagation path between the P units of terminals and base station BS1 based on information on the P units of terminals, at every data transmission cycle. Base station BS1 transmits an instruction for measuring and reporting channel state information (CSI) as CSI report request specification terminal information to each terminal currently connected to base station BS1. The L units of terminals for which a request for reporting channel state information (CSI) is specified measure channel state information (CSI) and report the measurement result of the channel state information (CSI) to base station BS1. Base station BS1 selects M (M: an integer satisfying 2≤M≤L) terminals capable of spatial multiplex communication in a data transmission cycle and transmits data to and from the M terminals via the plurality of antennas Ab1 to Ab100 by using spatial multiplex communication based on the reporting of the measurement result of the channel state information (CSI) from the L terminals.

That is, wireless communication system 10 makes a definitive determination of the terminals that are to measure and report channel state information (CSI) from all the terminals (P units of terminals) in base station BS1 to L units of terminals. In this way, wireless communication system 10 may adaptively suppress an increase in uplink (UL) traffic that is caused by measurement of channel state information (CSI) indicating the state of a propagation path between each of antennas Ab1 to Ab100 of base station BS1 to which the terminal is connected and each antenna of the terminal and reporting of channel state information (CSI) to base station BS1. In addition, since it is unnecessary for base station BS1 to measure and report channel state information (CSI) at terminals not determined as L units of terminals, wireless communication system 10 may adaptively suppress an increase in power consumption at these terminals. Therefore, wireless communication system 10 may realize a good and comfortable downlink (DL) MU-MIMO communication environment between base station BS1 and the total of M units of terminals selected based on the measurement result of the channel state information (CSI).

In addition, the information on the P units of terminals held by base station BS1 in memory MB1 includes the terminal identification information at each terminal connected to base station BS1. Base station BS1 determines L terminals at every data transmission cycle according to the terminal identification number corresponding to the terminal connected to base station BS1 in this order. The numbers of L units selected at every data transmission cycle are shifted and circulated (return to No. 1 after the last number). In this way, base station BS1 may easily and quickly determine L units of terminals that are to report channel state information (CSI) at every data transmission cycle.

In addition, the information on the P units of terminals held by base station BS1 in memory MB1 includes information on the amount of downlink data transmitted by base station BS1 to each terminal. Base station BS1 determines L terminals in preference to the terminal with a larger amount of downlink data. In this way, base station BS1 may determine L units of specified terminals that are to report channel state information (CSI) so that communication with a terminal (destination) to which data (for example, video data) with a large amount of DL transmission data is sent, may be continued with priority.

In addition, the information on the P units of terminals held by base station BS1 in memory MB1 includes rank information in the predetermined agreement. Based on the rank information in the predetermined agreement, base station BS1 determines L terminals in preference to a terminal with higher rank information. In this way, base station BS1 may determine L specified terminals that are to report channel state information (CSI) in order to prioritize communication with terminals of a part of paid members who have made a predetermined agreement and even terminals of paid members belonging to a higher rank or level of agreement among the paid members, for example.

Exemplary Embodiment 2

In Exemplary Embodiment 1, a terminal that measures and reports channel state information (CSI) is determined by base station BS1. In Exemplary Embodiment 2, the terminal itself currently connected to a base station determines necessity of measurement and reporting of channel state information (CSI).

Since the configuration of wireless communication system 10 according to Exemplary Embodiment 2 is the same as the configuration of wireless communication system 10 according to Exemplary Embodiment 1 shown in FIG. 1, the description overlapping with Exemplary Embodiment 1 will be simplified or omitted. In Exemplary Embodiment 2, wireless communication system 10 is configured to include one base station BS1a and a plurality of terminals TM1a, TM2a, . . . , and TM100a. In Exemplary Embodiment 2, the internal configuration of base station BS1a and the respective terminals is different in part from the internal configuration of base station BS1 and the respective terminals of Exemplary Embodiment 1.

Figure 6:
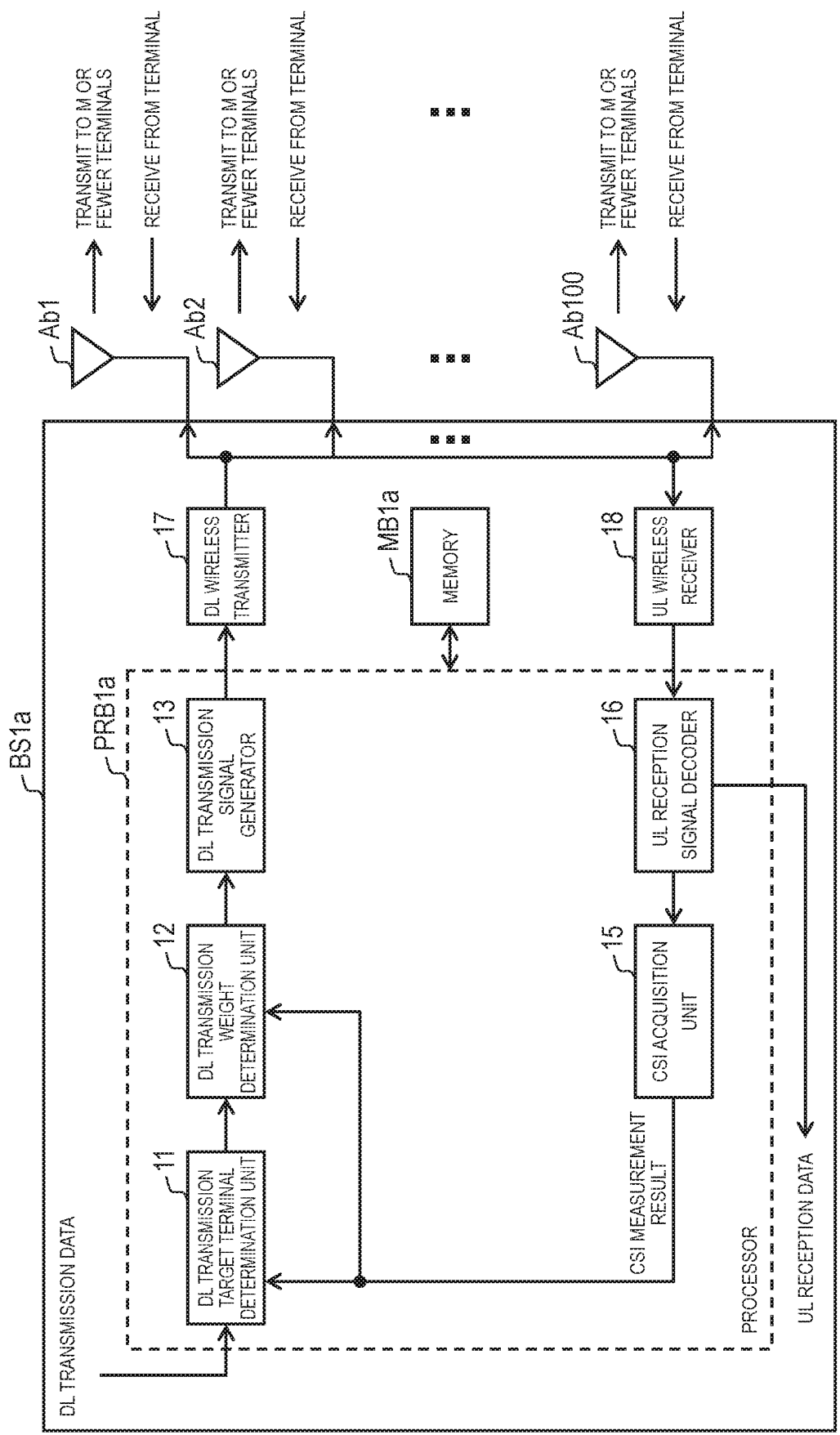
FIG. 6 is a block diagram showing an example of an internal configuration of a base station according to Exemplary Embodiment 2 in detail.

FIG. 6 is a block diagram showing an example of an internal configuration of base station BS1a according to Exemplary Embodiment 2 in detail.

Base station BS1a shown in FIG. 6 is configured to include processor PRB1a, memory MB1a, DL wireless transmitter 17, UL wireless receiver 18, and antennas Ab1 to Ab100. In FIGS. 1 and 6, the number of antennas possessed by base station BS1a is exemplified as 100, but it is needless to say that the number of antennas is not limited to 100.

Processor PRB1a is configured by using, for example, a CPU, an MPU, or a DSP. Processor PRB1a cooperates with memory MB1a to perform various processes and controls. More specifically, processor PRB1a refers to the program and data stored in memory MB1a and executes the program to realize the functions of the following units. Each of these units includes DL transmission target terminal determination unit 11, DL transmission weight determination unit 12, DL transmission signal generator 13, CSI acquisition unit 15, and UL reception signal decoder 16, but since the operation of each of these units is substantially the same as that in Exemplary Embodiment 1, the description thereof will be omitted.

In Exemplary Embodiment 1, both a reference signal (RS: Reference Signal, for example, fixed pattern data) enabling measurement of channel state information (CSI) and a control signal (that is, CSI report specification terminal information) specifying L units of terminals are transmitted from base station BS1. In Exemplary Embodiment 2, it is only necessary that a reference signal (RS: Reference Signal, for example, fixed pattern data) enabling measurement of channel state information (CSI) is periodically transmitted from a base station.

Memory MB1a includes, for example, a RAM as a work memory to be used at the time of processing of base station BS1a, and a ROM for storing a program and data defining the operation of base station BS1a. Various data and information are temporarily stored in the RAM.

Figure 7:
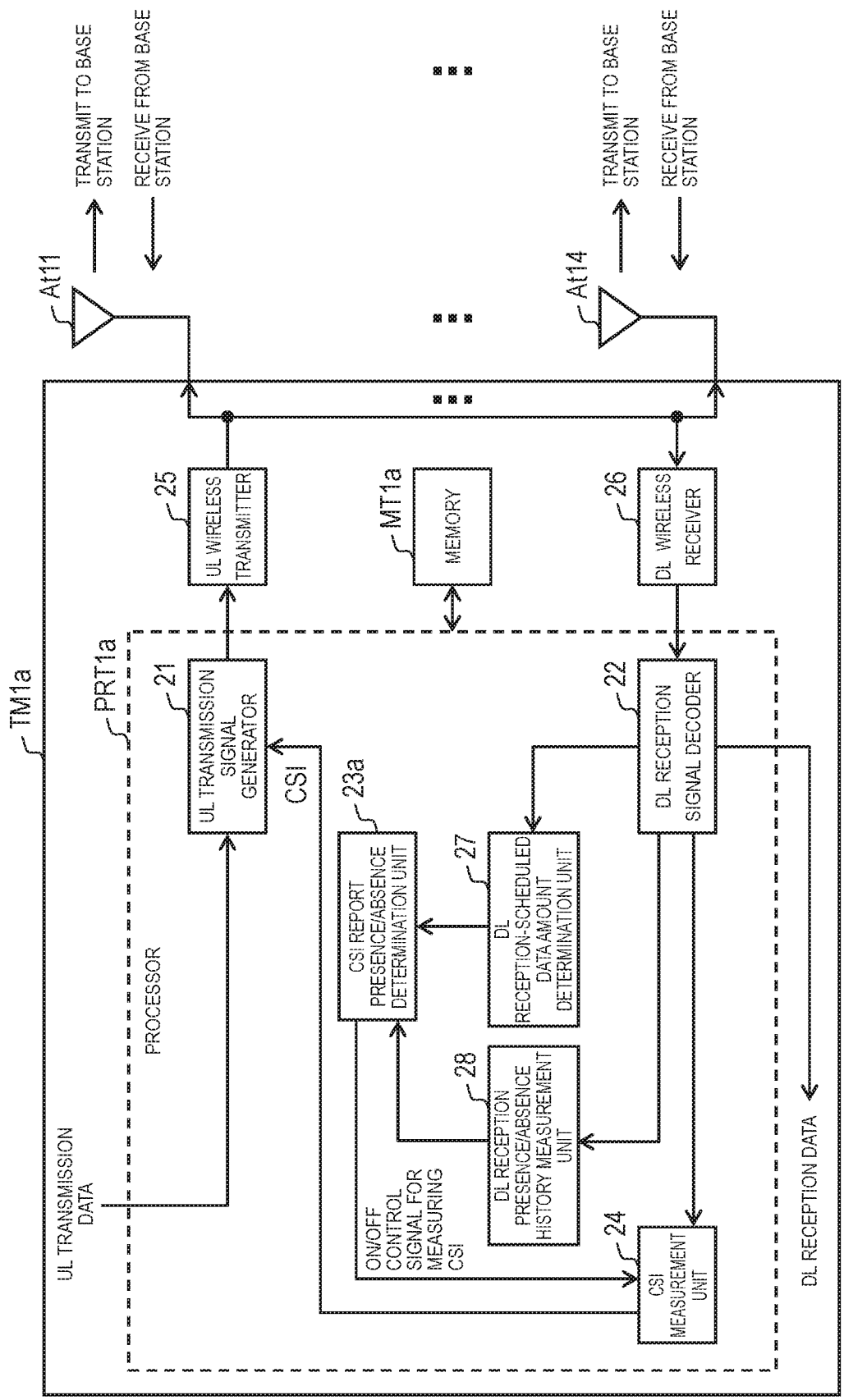
FIG. 7 is a block diagram showing an example of an internal configuration of a terminal according to Exemplary Embodiment 2 in detail.

FIG. 7 is a block diagram showing an example of an internal configuration of a terminal according to Exemplary Embodiment 2 in detail.

Since the internal configuration of each of terminals TM1a to TM100a shown in FIG. 1 is the same, in FIG. 7, terminal TM1a will be exemplified and described in detail.

Terminal TM1a shown in FIG. 7 is configured to include processor PRT1a, memory MT1a, UL wireless transmitter 25, DL wireless receiver 26, and antennas At11 to At14. In FIGS. 1 and 7, the number of antennas possessed by terminal TM1a is exemplified as 4, but it is needless to say that the number of antennas is not limited to 4.

Processor PRT1a is configured by using, for example, a CPU, an MPU, or a DSP. Processor PRT1a cooperates with memory MT1a to perform various processes and controls. More specifically, processor PRT1a refers to the program and data stored in memory MT1a and executes the program to realize the functions of the following units. Each of these units includes UL transmission signal generator 21, DL reception signal decoder 22, CSI report presence/absence determination unit 23a, CSI measurement unit 24, DL reception-scheduled data amount determination unit 27, and DL reception presence/absence history measurement unit 28, but since the operations of UL transmission signal generator 21, DL reception signal decoder 22, and CSI measurement unit 24 are the same as those in Exemplary Embodiment 1, the description thereof will be omitted.

The decoded output of DL reception signal decoder 22 is the reference signal (RS) and the DL reception data transmitted from base station BS1a. There may be no DL reception data addressed to the terminal itself.

DL reception signal decoder 22 outputs the reference signal (RS) transmitted from base station BS1a to CSI measurement unit 24. On the other hand, in a case where DL reception signal decoder 22 obtains the DL reception data transmitted from base station BS1a, DL reception signal decoder 22 outputs the DL reception data to the application (not shown) and also outputs the DL reception data to DL reception-scheduled data amount determination unit 27 and DL reception presence/absence history measurement unit 28, respectively, in order to store that data is received in a data transmission cycle.

When acquiring the information indicating that the reference signal (RS) has been received from DL reception signal decoder 22, DL reception-scheduled data amount determination unit 27 reads the terminal-related information (an example of information on the terminal itself, see FIG. 8) stored (held) in memory MT1a and determines the amount of data [megabytes] scheduled to be received in the downlink (DL) from base station BS1a to the terminal itself. DL reception-scheduled data amount determination unit 27 outputs information on a determination value of the amount of data scheduled to be received in the downlink to CSI report presence/absence determination unit 23a.

When acquiring the information that the reference signal (RS) has been received from DL reception signal decoder 22, DL reception presence/absence history measurement unit 28 reads the terminal-related information (an example of information on the terminal itself, see FIG. 8) stored (held) in memory MT1a and measures the status of the past reception history at every data transmission cycle from base station BS1a to the terminal itself. DL reception presence/absence history measurement unit 28 outputs information on the measurement result of the past reception history status at every data transmission cycle to CSI report presence/absence determination unit 23a.

CSI report presence/absence determination unit 23a reads the terminal-related information (an example of information on the terminal itself, see FIG. 8) stored (held) in memory MT1a to determine whether or not the terminal itself needs to measure and report channel state information (CSI), based on the terminal-related information on the terminal itself.

FIG. 8 is a diagram showing an example of terminal-related information for each terminal connected to base station BS1a.

In FIG. 8, terminal-related information of all the terminals (for example, P=100 units) currently connected to base station BS1a are shown combined, but memory MT1a of each terminal holds only the information of the record corresponding to the terminal identification number of the terminal itself shown in FIG. 8.

The terminal-related information of each terminal held in memory MT1a includes terminal identification number, group, amount of DL reception-scheduled data at every data transmission cycle, value n (see later) of the terminal, DL reception history at every past data transmission cycle, the number of data transmission cycles (value r, see later) in which data has not been received consecutively in the past, and a determination result of necessity of measuring and reporting CSI.

The group is set corresponding to the terminal identification number (for example, the value of the lower 1 digit or the lower 2 digits of the terminal identification number). In FIG. 8, for example, the group is set corresponding to the value of the lower 1 digit, and a terminal whose lower 1 digit of the terminal identification number is "1" is set to group "G1", a terminal whose lower 1 digit of the terminal identification number is "2" is set to group "G2", . . . , and a terminal whose lower 1 digit of the terminal identification number is "0" is set to group "G10". In addition, the group setting method is not limited to the method of setting corresponding to the lower 1 digit or the lower 2 digits of the terminal identification number. In addition, the terminal identification number may be, for example, a telephone number of a terminal or a manufacturing number of a terminal.

In the case of determining whether or not the terminal itself needs to measure and report channel state information (CSI) in order of the group, CSI report presence/absence determination unit 23a enables all terminals to grasp the update of the group number in synchronization based on information known to the terminal, such as the number of a transmission data cycle and the like. In this way, CSI report presence/absence determination unit 23a may easily and quickly determine whether or not it is necessary to measure and report channel state information (CSI) at every data transmission cycle. In addition, the transmission of the CSI report request specification terminal information from base station BS1 to the terminal, which is necessary in Exemplary Embodiment 1 may be made unnecessary in Exemplary Embodiment 2.

Value n of the terminal is a threshold value to be used when CSI report presence/absence determination unit 23a determines whether or not the terminal itself needs to measure and report channel state information (CSI).

CSI report presence/absence determination unit 23a determines whether or not the terminal itself needs to measure and report channel state information (CSI) based on value n read out from the terminal-related information on the terminal itself stored (held) in memory MT1a and information on the measurement result of the status of the past reception history at every data transmission cycle from DL reception presence/absence history measurement unit 28. Specifically, in a case where the downlink data (DL reception data) has not been received in the past n data transmission cycles, CSI report presence/absence determination unit 23a determines that the terminal itself measures and reports channel state information (CSI). In this way, CSI report presence/absence determination unit 23a may expect that base station BS1a does not continue to transmit downlink data (DL reception data) only to a specific terminal and downlink data (DL reception data) is received at the terminal itself which has not received the downlink data (DL reception data) for a while.

In addition, value n may be a predetermined integer value (that is, a fixed value) of 2 or more, for example. In this way, CSI report presence/absence determination unit 23a may transmit downlink data (DL reception data) all over and equally in all the terminals currently connected to base station BS1a. Therefore, CSI report presence/absence determination unit 23a may support so that base station BS1a performs spatial multiplex communication with many terminals at every short data transmission cycle (for example, 1 ms or 10 ms).

In addition, CSI report presence/absence determination unit 23a may change value n to a value at every data transmission cycle based on the information on the determination value of the amount of data scheduled to be received on the downlink from DL reception-scheduled data amount determination unit 27 without setting value n as a fixed value. For example, CSI report presence/absence determination unit 23a may obtain value n at every data transmission cycle by calculating value n="10÷(amount of data scheduled to be received on downlink [megabytes])". In this way, for example, in a case where downlink data (DL reception data) of a large size is transmitted, CSI report presence/absence determination unit 23a may flexibly set value n to a small value so that the priority of communication with base station BS1a gets higher in view of the size of the downlink data (DL reception data) transmitted from base station BS1a. In addition, for example, in a case where downlink data (DL reception data) of a small size is transmitted, CSI report presence/absence determination unit 23a may flexibly set value n to a large value so that the priority of communication with base station BS1a gets lower in view of the size of the downlink data (DL reception data) transmitted from base station BS1a.

In FIG. 8, the past DL reception history indicates the presence or absence of reception of downlink data (DL reception data) at every data transmission cycle ("○" indicates reception, and "x" indicates no reception") from the left side of the page of FIG. 8 toward the right side of the page.

For example, at the terminal with terminal identification number "#1", there is no reception of downlink data (DL reception data) in the last five times of data transmission cycles, and r=5. Therefore, in a case where CSI report presence/absence determination unit 23a determines the necessity of measurement and reporting of channel state information (CSI) by using value n of the terminal itself, in the terminal with the terminal identification number "#1", since n (=4)<r (=5), CSI report presence/absence determination unit 23a determines to perform measurement and report of channel state information (CSI) by the terminal itself.

For example, at the terminal with terminal identification number "#2", there is no reception of downlink data (DL reception data) in the last two times of data transmission cycles, and r=2. Therefore, in a case where CSI report presence/absence determination unit 23a determines the necessity of measurement and reporting of channel state information (CSI) by using value n of the terminal itself, in the terminal with the terminal identification number "#2", since n (=33)>r (=2), CSI report presence/absence determination unit 23a determines not to perform measurement and report of channel state information (CSI) by the terminal itself. In a case where CSI report presence/absence determination unit 23a determines the necessity of measurement and reporting of channel state information (CSI) by using value n of the terminal itself, similar determination is made in other terminals.

Memory MT1a includes, for example, a RAM as a work memory to be used at the time of the processing of terminal TM1a, and a ROM for storing a program and data defining the operation of terminal TM1a. Various data and information are temporarily stored in the RAM. For example, memory MT1a temporarily stores the measurement result of the channel state information (CSI) measured by CSI measurement unit 24 and the terminal-related information (see FIG. 8) related to the terminal itself.

Next, the operation procedure of base station BS1a and a terminal in Exemplary Embodiment 2 will be described with reference to FIG. 9. FIG. 9 is a flowchart showing an example of each operation procedure of base station BS1a and a terminal according to Exemplary Embodiment 2 in detail. In the description of FIG. 9, the operation procedure of the terminal will be described by exemplifying terminal TM1a shown in FIG. 1. Base station BS1a and terminal TM1a repeat the respective operation flows shown in FIG. 9 at every data transmission cycle.

In FIG. 9, terminal TM1a reads the terminal-related information (an example of information on the terminal itself, see FIG. 8) stored (held) in memory MT1a and determines whether or not the terminal itself needs to measure and report channel state information (CSI) based on the terminal-related information on terminal MT1a (S15). As described above, for example, a method of determining whether or not a terminal itself needs to measure and report channel state information (CSI) is any one of a method of determining whether a terminal itself belongs to a group indicated by group information corresponding to the terminal identification number of the terminal itself based on the terminal-related information held in memory MT1a or a method of determining whether or not downlink data (DL reception data) has been received over the past n data transmission cycles based on the terminal-related information held in memory MT1a. However, the method of determining whether or not the terminal itself needs to measure and report channel state information (CSI) is not limited to these determination methods.

Therefore, in Exemplary Embodiment 2, as a result of processing of step S15, the measurement results of the CSI from all the terminals (P units) currently connected to base station BS1a are not reported to base station BS1a, and measurement results of CSI are reported from a part of the P units of terminals. In this way, when the measurement result of the CSI is reported from the terminal, it is possible to suppress an increase in traffic in the uplink (UL).

Terminal TM1a determines whether or not the terminal itself needs to measure and report channel state information (CSI) (S16). In a case where terminal TM1a determines that the terminal itself does not need to measure and report channel state information (CSI) (S16, NO), the processing of terminal TM1a ends.

On the other hand, in a case where terminal TM1a determines that the terminal itself needs to measure and report channel state information (CSI) (S16, YES), terminal TM1a measures channel state information (CSI) indicating the state of the propagation path between base station BS1a and the terminal itself based on the reception processing of the reference signal (RS) transmitted from base station BS1a (S12). Terminal TM1a generates and transmit (reports) the measurement result of the channel state information (CSI) to base station BS1a (S13).

Base station BS1a receives the measurement result of the channel state information (CSI) transmitted from terminal TM1a in step S13 (S3). In step S3, base station BS1a receives measurement results of the respective channel state information (CSI) from a part of the P units of terminals that have determined to measure and report channel state information (CSI).

Base station BS1a performs various signal processing for transmission of downlink transmission data (DL transmission data) by using the beamforming technique (S4A). For example, in DL transmission target terminal determination unit 11, base station BS1a selects M units of terminals as a terminal (destination) to which the UL transmission data is sent by considering whether the channel state information (CSI) is good among the measurement results of the channel state information (CSI) received from a part of terminals in step S3, which M terminals are combined to make each MIMO stream have a high transmission rate or the like. In DL transmission weight determination unit 12, base station BS1a calculates and determines a transmission weight for forming the directivity of the transmission beam from base station BS1a to each of the M units of terminals based on the information on the M units of terminals and the measurement result of the channel state information (CSI) from each specified terminal. Base station BS1a generates DL transmission signals that may be transmitted to the M units of terminals capable of simultaneous spatial multiplex communication (MU-MIMO communication) on the same frequency by using the transmission weight and the DL transmission data in DL transmission signal generator 13.

Base station BS1a transmits the DL transmission signals generated by the beamforming technique in step S4A from respective antennas Ab1 to Ab100 to the M units of terminals (S5).

In step S4A, the terminals (in other words, terminals selected as a total of M units of terminals) selected as a terminal (destination) to which downlink transmission data (DL transmission data) is sent, receive the DL transmission signals transmitted from base station BS1a in step S5 (S14). Even if the terminal is determined to measure and report channel state information (CSI) in step S15, the terminal not selected as a terminal (destination) to which transmission data (DL transmission data) of the downlink is sent in step S4A, does not receive the DL transmission signal transmitted from base station BS1a in step S5.

As described above, in wireless communication system 10 of Exemplary Embodiment 2, the terminal currently connected to base station BS1a holds the terminal-related information (an example of information on the terminal itself) on the terminal itself in memory MT1a and determines whether or not to report channel state information (CSI) indicating the state of the propagation path to base station BS1a, based on the terminal-related information on the terminal itself, at every data transmission cycle. The terminal measures channel state information (CSI) and reports the measurement result of the channel state information (CSI) to base station BS1a, based on the determination to report the channel state information (CSI). Base station BS1a selects M (M: an integer satisfying $2 \leq M \leq L$) terminals capable of spatial multiplex communication in the data transmission cycle based on the reporting of the measurement result of the channel state information (CSI) from the terminals. Base station BS1a transmits DL transmission data (an example of data) to M terminals via a plurality of antennas Ab1 to Ab100 by using spatial multiplex communication. In a case where the terminal is selected as M (M: a preset value of 2 or more) terminals capable of spatial multiplex communication with base station BS1a in a data transmission cycle based on the measurement result of channel state information (CSI), the terminal receives the DL transmission data (an example of data) transmitted from base station BS1a by using the spatial multiplex communication.

That is, wireless communication system 10 determines whether or not it is necessary to measure and report channel state information (CSI) in each of all the terminals (P units of terminals) currently connected to base station BS1a. As a result of this determination, measurement and reporting of the channel state information (CSI) is performed only in a part of the P units of terminals (for example, about L units of terminals in Exemplary Embodiment 1 or slightly increasing or decreasing from L). In this way, wireless communication system 10 may adaptively suppress an increase in uplink (UL) traffic that is caused by measurement of channel state information (CSI) indicating the state of a propagation path between each of antennas Ab1 to Ab100 of base station BS1 to which the terminal is connected and each antenna of the terminal and reporting of channel state information (CSI) to base station BS1. In addition, since wireless communication system 10 may determine a terminal that does not need to measure and report channel state information (CSI) based on the determination of the terminal itself, it is possible to adaptively suppress an increase in power consumption at these terminals. Therefore, wireless communication system 10 may realize a good and comfortable downlink (DL) MU-MIMO communication environment between base station BS1 and the total of M units of terminals selected based on the measurement result of the channel state information (CSI).

In addition, the terminal-related information on the terminal itself held by each terminal in memory MT1a includes group information corresponding to the terminal identification number of the terminal itself. The terminal determines whether or not the terminal itself needs to measure and report channel state information (CSI) in order of the group indicated by this group information. In this way, the terminal may easily and quickly determine whether or not it is necessary to measure and report channel state information (CSI) at every data transmission cycle.

In addition, the terminal-related information on the terminal itself held by each terminal in memory MT1a includes reception history information indicating the presence or absence of reception of downlink data (DL reception data) from base station BS1a at every past data transmission cycle. In a case where there is no data reception from base station BS1a over the past n (n: an integer of 2 or more) data transmission cycles, the terminal determines to measure and report channel state information (CSI). In this way, the terminal may expect that base station BS1a does not continue to transmit downlink data (DL reception data) only to a specific terminal and downlink data (DL reception data) is received at the terminal itself which has not received the downlink data (DL reception data) for a while.

In addition, in the terminal-related information on the terminal itself held by each terminal in memory MT1a, value n may be a fixed value. In this way, the terminal may transmit downlink data (DL reception data) all over and equally in all the terminals currently connected to base station BS1a. Therefore, the terminal may support so that base station BS1a performs spatial multiplex communication with many terminals at every short data transmission cycle (for example, 1 ms or 10 ms).

In addition, the terminal-related information related to the terminal itself held by each terminal in memory MT1a further includes the information of the amount of downlink data (amount of DL reception data) to be transmitted from base station BS1a. In a case where the amount of downlink data (amount of DL reception data) transmitted from base station BS1a is larger than a predetermined threshold value, the terminal sets value n to be smaller than a current value according to the amount of downlink data (amount of DL reception data). In this way, for example, in a case where downlink data (DL reception data) of a large size is transmitted, the terminal may flexibly set value n to a small value so that the priority of communication with base station BS1a gets higher in view of the size of the downlink data (DL reception data) transmitted from base station BS1a.

In addition, the terminal-related information related to the terminal itself held by each terminal in memory MT1a further includes the information of the amount of downlink data (amount of DL reception data) to be transmitted from base station BS1a. In a case where the amount of downlink data (amount of DL reception data) transmitted from base station BS1a is smaller than a predetermined threshold value, the terminal sets value n to be larger than a current value according to the amount of downlink data (amount of DL reception data). In this way, for example, in a case where downlink data (DL reception data) of a small size is transmitted, the terminal may flexibly set value n to a large value so that the priority of communication with base station BS1a gets lower in view of the size of the downlink data (DL reception data) transmitted from base station BS1a.

Various exemplary embodiments have been described with reference to the drawings, but it goes without saying that the present disclosure is not limited to such an example. Within the category described in the claims, it will be apparent to those skilled in the art that various changed examples or modification examples may be conceived, and it should be understood that such modifications naturally belong to the technical scope of the present disclosure. In addition, each constituent element in the above exemplary embodiment may be arbitrarily combined without departing from the gist of the invention.

INDUSTRIAL APPLICABILITY

The present disclosure is useful as a terminal, a base station, a wireless communication system, and a channel state information acquisition method that adaptively suppress an increase in uplink traffic and an increase in power consumption at the terminal, which is caused by measurement of channel state information indicating the state of a propagation path between the terminal connected to the base station and each antenna of the base station and reporting of the channel state information to the base station, and realize comfortable MU-MIMO communication environment.

REFERENCE MARKS IN THE DRAWINGS

10 WIRELESS COMMUNICATION SYSTEM
11 DL TRANSMISSION TARGET TERMINAL DETERMINATION UNIT
12 DL TRANSMISSION WEIGHT DETERMINATION UNIT
13 DL TRANSMISSION SIGNAL GENERATOR
14 CSI REPORT REQUEST SPECIFICATION TERMINAL DETERMINATION UNIT
15 CSI ACQUISITION UNIT
16 UL RECEPTION SIGNAL DECODER
17 DL WIRELESS TRANSMITTER
18 UL WIRELESS RECEIVER
21 UL TRANSMISSION SIGNAL GENERATOR
22 DL RECEPTION SIGNAL DECODER
23, 23a CSI REPORT PRESENCE/ABSENCE DETERMINATION UNIT
24 CSI MEASUREMENT UNIT
25 UL WIRELESS TRANSMITTER
26 DL WIRELESS RECEIVER
27 DL RECEPTION-SCHEDULED DATA AMOUNT DETERMINATION UNIT
28 DL RECEPTION PRESENCE/ABSENCE HISTORY MEASUREMENT UNIT
Ab1, Ab2, Ab100, At11, At14, At21, At24, At1001, At1004 ANTENNA
BS1, BS1a BASE STATION
TM1, TM1a, TM2, TM2a, TM100, TM100a TERMINAL
MB1, MB1a, MT1, MT1a MEMORY
PRB1, PRB1a, PRT1, PRT1a PROCESSOR
T1, T2 CONNECTED TERMINAL LIST

The invention claimed is:
1. A channel state information acquisition method in a base station capable of wireless communication with a plurality of terminals, the method comprising:
   a step of holding information on P (P: an integer of 3 or more) terminals currently connected to the base station, wherein the information on the P terminals includes terminal identification information on each terminal connected to the base station;
   a step of determining L (L: an integer satisfying 2≤L<P) terminals that are to report channel state information indicating a state of a propagation path to the base station from among the P terminals based on the information on the P terminals and in order of the terminal identification information on each terminal, at every data transmission cycle;
   a step of selecting M (M: an integer satisfying 2≤M≤L) terminals capable of spatial multiplex communication in the data transmission cycle based on the reporting of the channel state information from the L terminals; and
   a step of transmitting data to and from the M terminals via a plurality of antennas using the spatial multiplex communication.
2. The channel state information acquisition method of claim 1,
   wherein the information on the P terminals includes group information corresponding to terminal identification information on each terminal.
3. The channel state information acquisition method of claim 1, wherein the information on the P terminals includes reception history information indicating whether or not data from the base station has been received at each terminal at every past data transmission cycle.

4. The channel state information acquisition method of claim 1,
wherein the information on the P terminals includes information on an amount of downlink data to be transmitted to each terminal.

5. The channel state information acquisition method of claim 1,
wherein the information on the P terminals includes rank information in a predetermined agreement.

6. A terminal that is capable of communicating with a base station, the terminal comprising:
a memory that holds information on the terminal itself;
a determination unit that determines necessity of reporting channel state information indicating a state of a propagation path to the base station based on the information on the terminal itself, at every data transmission cycle;
a measurement unit that measures the channel state information based on the determination to report the channel state information; and
a communicator that reports a measurement result of the channel state information to the base station,
wherein the communicator receives data transmitted from the base station in a case where the terminal is one of M (M: 2 or more preset values) terminals capable of spatial multiplex communication with the base station in the data transmission cycle that are selected based on the measurement result of the channel state information.

7. The terminal of claim 6,
wherein the information on the terminal itself includes group information corresponding to an identification number of the terminal itself, and
the determination unit determines necessity of reporting the channel state information based on the group information.

8. The terminal of claim 6,
wherein the information on the terminal itself includes reception history information indicating whether or not data has been received from the base station at every past data transmission cycle, and
in a case where data has not been received from the base station over the past n (n: an integer of 2 or more) data transmission cycles, the determination unit determines to report the channel state information.

9. The terminal of claim 8,
wherein the value n is a predetermined integer value of 2 or more.

10. The terminal of claim 8,
wherein the information on the terminal itself further includes information on an amount of data to be transmitted from the base station, and
in a case where the amount of data to be transmitted from the base station is larger than a predetermined threshold value, the determination unit sets the value n to be smaller than a current value according to the amount of data.

11. The terminal of claim 8,
wherein the information on the terminal itself further includes information on an amount of data to be transmitted from the base station, and
in a case where the amount of data to be transmitted from the base station is smaller than a predetermined threshold value, the determination unit sets the value n to be larger than a current value according to the amount of data.

12. A channel state information acquisition method in a terminal capable of communicating with a base station, the method comprising:
a step of holding information on the terminal itself;
a step of determining necessity of reporting channel state information indicating a state of a propagation path to the base station based on the information on the terminal itself, at every data transmission cycle;
a step of measuring the channel state information based on the determination to report the channel state information;
a step of reporting a measurement result of the channel state information to the base station; and
a step of receiving data transmitted from the base station in a case where the terminal is one of M (M: 2 or more preset values) terminals capable of spatial multiplex communication with the base station in the data transmission cycle that are selected based on the measurement result of the channel state information.

13. A wireless communication system capable of wireless communication between a plurality of terminals and a base station,
wherein the terminal
holds information on the terminal itself,
determines necessity of reporting channel state information indicating a state of a propagation path to the base station based on the information on the terminal itself, at every data transmission cycle,
measures the channel state information based on the determination to report the channel state information, and
reports a measurement result of the channel state information to the base station, and
the base station
selects M (M: an integer satisfying 2≤M≤L) terminals capable of spatial multiplex communication in the data transmission cycle based on the reporting of the measurement result of the channel state information from the terminals, and
transmits data to and from the M terminals via a plurality of antennas using the spatial multiplex communication, and
the terminal
receives the data transmitted from the base station by using the spatial multiplex communication in a case where the terminal is one of M (M: a preset value of 2 or more) terminals capable of spatial multiplex communication with the base station in the data transmission cycle that are selected based on the measurement result of the channel state information.

14. A channel state information acquisition method in a base station capable of wireless communication with a plurality of terminals, the method comprising:
a step of holding information on P (P: an integer of 3 or more) terminals currently connected to the base station, wherein the information on the P terminals includes information on an amount of downlink data to be transmitted to each terminal;
a step of determining L (L: an integer satisfying 2≤L<P) terminals that are to report channel state information indicating a state of a propagation path to the base station from among the P terminals based on the information on the P terminals and in preference to a terminal with a larger amount of downlink data, at every data transmission cycle;

a step of selecting M (M: an integer satisfying 2≤M≤L) terminals capable of spatial multiplex communication in the data transmission cycle based on the reporting of the channel state information from the L terminals; and a step of transmitting data to and from the M terminals via a plurality of antennas using the spatial multiplex communication.

15. The channel state information acquisition method of claim 14, wherein the information on the P terminals includes group information corresponding to terminal identification information on each terminal.

16. The channel state information acquisition method of claim 14, wherein the information on the P terminals includes reception history information indicating whether or not data from the base station has been received at each terminal at every past data transmission cycle.

17. A channel state information acquisition method in a base station capable of wireless communication with a plurality of terminals, the method comprising:

a step of holding information on P (P: an integer of 3 or more) terminals currently connected to the base station, wherein the information on the P terminals includes rank information in a predetermined agreement;

a step of determining L (L: an integer satisfying 2≤L<P) terminals that are to report channel state information indicating a state of a propagation path to the base station from among the P terminals based on the information on the P terminals and in preference to a terminal having higher rank information based on the rank information in the predetermined agreement, at every data transmission cycle;

a step of selecting M (M: an integer satisfying 2≤M≤L) terminals capable of spatial multiplex communication in the data transmission cycle based on the reporting of the channel state information from the L terminals; and a step of transmitting data to and from the M terminals via a plurality of antennas using the spatial multiplex communication.

18. The channel state information acquisition method of claim 17, wherein the information on the P terminals includes group information corresponding to terminal identification information on each terminal.

19. The channel state information acquisition method of claim 17, wherein the information on the P terminals includes reception history information indicating whether or not data from the base station has been received at each terminal at every past data transmission cycle.

* * * * *